United States Patent

Miyashita et al.

[11] Patent Number: 5,110,468
[45] Date of Patent: May 5, 1992

[54] FRESH WATER GENERATOR

[75] Inventors: Susumu Miyashita, Kodaira; Tadashi Ishimura, Nishitama; Yoshiaki Hironaka, Sayama, all of Japan

[73] Assignee: Kioritz Corporation, Tokyo, Japan

[21] Appl. No.: 641,411

[22] Filed: Jan. 15, 1991

[30] Foreign Application Priority Data

Jan. 16, 1990 [JP] Japan .................. 2-006762

[51] Int. Cl.⁵ .................................... C02F 1/44
[52] U.S. Cl. ...................... 210/321.69; 210/416.3; 210/424; 417/364
[58] Field of Search ............ 210/198.1, 205, 206, 210/258, 321.66, 321.69, 416.1, 416.3, 420, 424, 642; 417/364, 368, 423.9

[56] References Cited

U.S. PATENT DOCUMENTS

| Re. 32,144 | 5/1986 | Keefer | 210/321.66 |
| 4,288,326 | 9/1981 | Keefer | 210/321.66 |
| 4,289,456 | 9/1981 | Ishihara | 417/364 |
| 4,321,137 | 3/1982 | Kohler | 210/416.1 |
| 4,333,827 | 6/1982 | Cummins, II | 210/416.3 |
| 4,606,704 | 8/1986 | Sloan | 417/364 |

FOREIGN PATENT DOCUMENTS 3146588 6/1983 Fed. Rep. of Germany ................. 210/321.66

OTHER PUBLICATIONS

"HISUI" PF-1S-A Fresh Water Generator sales brochure, date unknown.

Primary Examiner—Peter Hruskoci
Assistant Examiner—Robert James Popovics
Attorney, Agent, or Firm—Browdy and Neimark

[57] ABSTRACT

A fresh water generator includes a primary pump for pumping up water to be treated, a secondary pump for pressure sending, and a filtering device for purifying the water to be treated which is sent from the secondary pump by pressure. The fresh water generator further includes interlocking devices for interlocking clutch means of transmission devices and an operation lever of a three-way valve. The operation lever can be switched to one position from the other position and vice versa. The one position is a position in which the clutch means are actuated, thereby transmitting drive power from an internal combustion engine to the primary pump. The other position is a position in which the clutch means are relaxed, thereby blocking transmission of the drive power to the primary pump.

2 Claims, 1 Drawing Sheet

FRESH WATER GENERATOR

BACKGROUND OF THE INVENTION

The present invention relates to a fresh water generator which purifies seawater or the like in order to obtain pure water suitable for drinking or the like.

Such a fresh water generator is generally equipped with a primary pump and a secondary pump. The primary pump, having a large lift and a relatively low pressure, is provided for sucking water into the generator from a water source such as seawater. The secondary pump, having a comparatively high pressure, is provided for further pressing water fed from the primary pump so as to send it to a filtering device for water purification. When the filtering device is cleaned and disinfected, a valve device is actuated to cut off water flowing from the primary pump to the secondary pump. While at the same time, chemicals, such as formalin, are pressed and fed from a chemical tank to the filtering device through the secondary pump in order to clean the filtering device. The primary pump as well as the secondary pump have heretofore been connected to two prime movers, respectively, which are provided as power sources, and are each separately driven. For the above reasons, the use of the fresh water generator is limited to where electric power is available. There are also disadvantages, such that the fresh water generator is heavyweight, and has limited versatility.

SUMMARY OF THE INVENTION

An object of the present invention is therefore to eliminate the foregoing disadvantages of the conventional art, and to provide a relatively compact fresh water generator which is highly economical and which is easily handled.

That is, the present invention provides a fresh water generator comprising: an internal combustion engine; a primary pump, driven by transmission devices, for pumping up water to be treated; a secondary pump, always driven by the internal combustion engine, for pressure sending; a three-way valve which is connected to the primary pump at a first inlet thereof, and which is conducted to a chemical tank at a second inlet thereof, and which is connected to the secondary pump at an outlet thereof, the three-way valve having an operation lever which can be rotated between a first position in which a first path between the first inlet and the outlet is connected, and in which a second path between the second inlet and the outlet is blocked, and a second position in which the first path between the first inlet and the outlet is blocked, and in which the second path between the second inlet and the outlet is conducted; a filtering device for purifying the water to be treated which is connected to the secondary pump and which is then sent by pressure; and interlocking devices for interlocking clutch means of the transmission devices and the operation lever of the three-way valve which can be switched to a first position in which the clutch means are actuated, thereby transmitting drive power from the internal combustion engine to the primary pump, from a second position in which the clutch means are relaxed, thereby blocking transmission of the drive power, and vice versa.

The primary pump and the secondary pump are thus driven by one internal combustion engine used as a power source. Furthermore, when the operation lever of the three-way valve, for switching to the feed of water to be treated from the feed of chemicals and vice versa, is actuated, the operation of the primary pump is interlocked for automatic switching and controlling. The fresh water generator, providing versatile use applications, of the present invention can be used where electric power is not available. Moreover, since only one internal combustion engine for use as a power source is installed on the fresh water generator, the generator can be made small in size and light in weight. In addition, only actuation of the operation lever of the three-way valve allows switching of the operations of the two pumps, thereby eliminating the disadvantage of pump idling.

PREFERRED EMBODIMENT OF THE INVENTION

Figure 1:
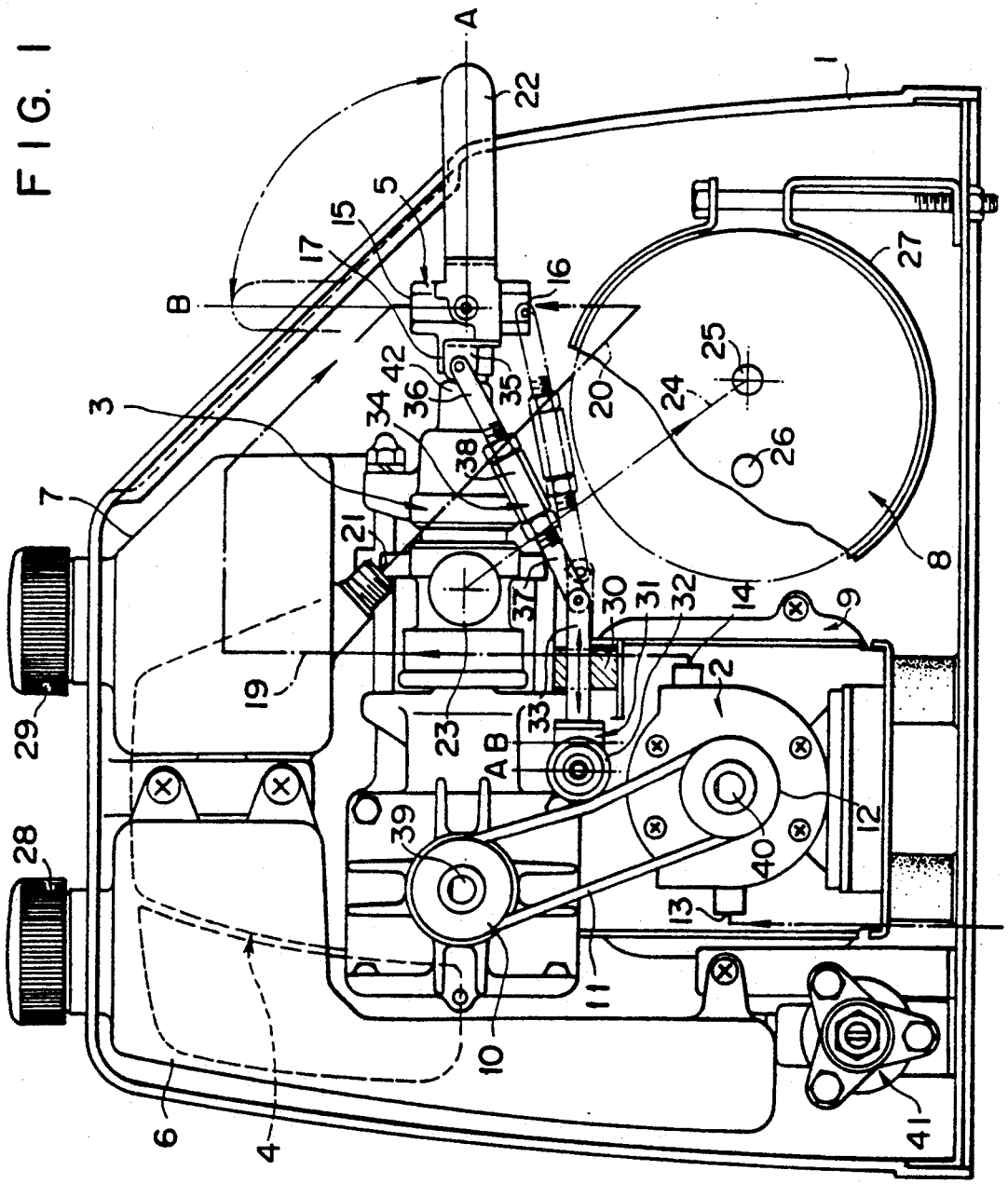
FIG. 1 is an elevation schematically showing an embodiment of a fresh water generator according to the present invention, with some components omitted for clarification.

The present invention will now be described with reference to an embodiment shown in the drawing.

A low pressure primary pump 2 of a rotary type or the like, having a lift of about 10 m, is arranged in the lower part of the main body 1 of a fresh water generator according to this embodiment. A secondary pump 3 of a plunger type or the like, capable of producing a pressure of, for example, about 60 kg/cm$^2$ is disposed at approximately the center of the main body 1. An internal combustion engine, such as a small air-cooling two-cycle gasoline engine 4, is arranged at the back of the high pressure secondary pump 3. A three-way valve 5, whose outlet 17 is directly connected to an inlet 42 of the secondary pump 3, is arranged. A fuel tank 6 for the internal combustion engine 4 and a chemical tank 7 for a cleaning and disinfection solution, such as formalin, are disposed in the upper part of the main body 1. Furthermore, a filtering device 8, composed of a hollow string film filter or the like for purifying water to be treated, is installed in the main body 1, on the front side of the primary pump 2.

The internal combustion engine 4 is fed with fuel from the fuel tank 6, and operates as a power source for the fresh water generator. The output shaft (not shown) of the internal combustion engine 4 is linked to a drive shaft 39 of the secondary pump 3 via a gear transmission device 9 including a centrifugal clutch. While the internal combustion engine 4 is operating at a predetermined number of revolutions, it always drives the secondary pump 3 at a rate sufficient to discharge a high pressure fluid suitable for purification at the filtering device 8. A driving pulley 10 is secured to the projected end of the drive shaft 39 of the secondary pump 3, and is connected, by an endless belt 11 which is fitted over the driving pulley 10, to a driven pulley 12 fixed to a rotary shaft 40 of the primary pump 2. As will be described later, the driving pulley 10 selectively drives the primary pump 2 by the power of the internal combustion engine 4. In this embodiment, the primary pump 2 is a vane pump, having an inlet 13 for sucking in water to be treated, such as seawater, and an outlet 14 for discharging the water at appropriate pressure.

The three-way valve 5 has two inlets 15 and 16, and one outlet 17 mentioned above. As described above, the three-way valve 5, whose outlet 17 communicates with the inlet 42 of the secondary pump 3, is attached to the secondary pump 3. The first inlet 15 of the three-way valve 5 is connected to the outlet 14 of the primary pump 2 by a conduit schematically indicated by a chain line 19. The second inlet 16 of the three-way valve 5 is connected, by a conduit schematically indicated by a chain line 20, to an outlet 21 at the lower end of the chemical tank 7. The three-way valve 5 has an operation lever 22 which can be rotated between a horizontal position "A" and a vertical position "B". When the operation lever 22 is in the horizontal position "A" denoted by a solid line, purification is being performed. On the contrary, when the operation lever 22 is in the vertical position "B" denoted by a chain line, through which the lever 22 is rotated approximately 90° from the horizontal position "A", cleaning and disinfecting are being performed. The operation lever 22 is connected to a valve member (not shown) of the three-way valve 5. The valve member operates in the following manner: When the operation lever 22 is in the horizontal position "A", the valve member conducts the first path between the first inlet 15 and the outlet 17, and at the same time it blocks the second path between the second inlet 16 and the outlet 17. On the other hand, when the operation lever 22 is in the vertical position "B", the valve member blocks the first path between the first inlet 15 and the outlet 17, and at the same time it conducts the second path between the second inlet 16 and the outlet 17. An outlet 23 of the secondary pump 3 is conducted to an inlet 25 of the filtering device 8 by means of a conduit 24 schematically indicated by a chain line. The filtering device 8 has an outlet 26 for discharging the water purified therein as drinking water or the like. In this embodiment, the filtering device 8 is a disposable filter module, which is removed from an attachment member 27 after a predetermined service time (for example, 300 hours) and which is replaced with a new module. Fuel is fed into the fuel tank 6 from an opening 28 with a screw cap, whereas formalin or the like is fed into the chemical tank 7 from an opening 29 with a screw cap.

A belt tension pulley 32, rotatably supported by a movable member 31, is provided. The movable member 31 can reciprocate within a fixed guide member 30 which is arranged close to the outside at the center of the endless belt 11. The belt tension pulley 32 is capable of moving between a clutch engagement position "A" (indicated by a solid line) where it is pressed into contact with the endless belt 11 to tension the endless belt 11 and a clutch disengagement position "B" where the belt tension pulley 32 moves away from the endless belt 11 to relax the endless belt 11. When the belt tension pulley 32 is in the clutch engagement position "A", it transmits the turning force of the driving pulley 10 to the driven pulley 12 by means of the endless belt 11 which is moving while it is being tensioned, thereby driving the primary pump 2. On the other hand, when the belt tension pulley 32 is in the clutch disengagement position "B", since the endless belt 11 is not tensioned, the turning force of the driving pulley 10 is not effectively transmitted to the driven pulley 12. For this reason, the primary pump 2 remains in the stopped state.

One end of a connecting member 34 is pivotally connected to a back end 33 of the movable member 31. The other end of the connecting member 34 is pivotally connected to one end 35 of the operation lever 22 on the three-way valve 5. The connecting member 34 has a rod 36 on the side of the operation lever 22, another rod 37 on the side of the movable member 31, and a tube 38 screwed between the two rods 36, 37. Rotation of the tube 38 with respect to the rods 36, 37 permits the entire length of the connecting member 34 to be appropriately adjusted. With the above construction, as the operation lever 22 is rotated to the clutch engagement position "A", the movable member 31 shifts to the left in FIG. 1, thus bringing the belt tension pulley 32 into contact with the endless belt 11. The endless belt 11 is thereby kept tensioned, whereby the turning force of the driving pulley 10 is transmitted to the driven pulley 12. On the contrary, when the operation lever 22 is rotated to the clutch disengagement position "B", the movable member 31 shifts in the opposite direction, to the right, thus causing the belt tension pulley 32 to move away from the endless belt 11. The endless belt 11 is thereby relaxed, whereby the turning force of the driving pulley 10 will not be transmitted to the driven pulley 12. Thus, the guide member 30, the movable member 31, and the connecting member 34 act as an interlocking device for interlocking the operation lever 22 and the belt tension pulley 32. Adjustment of the length of the connecting member 34 allows an optimum pressure by the belt tension pulley 32 against the endless belt 11 to be easily adjusted.

Numeral 41 in FIG. 1 denotes an adjusting valve device for adjusting an outlet pressure of the secondary pump 3.

With the fresh water generator as constructed above, to purify water to be treated, such as seawater, when the operation lever 22 is rotated to the horizontal position "A" and clutch means 11, 32 are operated, the primary pump 2 and the secondary pump 3 are simultaneously driven. The water to be treated is pumped up by the primary pump 2 and is then fed to the secondary pump 3 through the conduit 19 and the three-way valve 5. The water to be treated is further pressed in the secondary pump 3, and is sent into the filtering device 8 via the conduit 24. It is then purified in the filtering device 8 and is discharged through the outlet 26 as drinking water or the like. During the above operation, the three-way valve 5 prevents the formalin in the chemical tank 7 from discharging toward the secondary pump 3. To clean and disinfect the filtering device 8, when the operation lever 22 is rotated to the vertical position "B", only the secondary pump 3 is driven. The formalin in the chemical tank 7 is sucked into the secondary pump 3 through the conduit 20 and the three-way valve 5. The formalin is then pressed and fed into the filtering device 8 via the conduit 24 while it is cleaning and disinfecting the secondary pump 3. The formalin then discharges through the outlet 26, after having cleaned and disinfected the filtering device 8. During the above operation, because the primary pump 2 remains stopped, and because the three-way valve 5 blocks the conduct between the conduit 19 and the secondary pump 3, water to be treated will not be sent to the secondary pump 3.

What is claimed is:

1. A fresh water generator comprising:
   an internal combustion engine;
   a primary pump, driven by transmission devices of said internal combustion engine, for pumping water to be treated;
   a secondary pump, always driven by said internal combustion engine, for pressurizing said water;
   a three-way valve connected: (A) to said primary pump at a first inlet thereof; (B) to a chemical tank at a second inlet thereof; and (C) to said secondary pump at an outlet thereof, said three-way valve having an operation lever that is rotatable between a first position in which a first path between the first inlet and said outlet is connected, and in which a second path between said second inlet and said outlet is blocked, and a second position in which the first path between said first inlet and said outlet is blocked, and in which the second path between said second inlet and said outlet is connected;

a filtering device for purifying water to be treated connected to said secondary pump which is sent by pressure; and interlocking means for clutch means of said transmission devices and said operation lever of said three-way valve which is switchable to a first position in which said clutch means are actuated to transmit drive power from said internal combustion engine to said primary pump, and from a second position in which said clutch means are relaxed to block transmission of the drive power.

2. A fresh water generator according to claim 1, wherein said clutch means of said transmission devices include an endless belt and a belt tension pulley.

* * * * *